US009330655B2

(12) United States Patent
Wirth

(10) Patent No.: US 9,330,655 B2
(45) Date of Patent: May 3, 2016

(54) INCREASING THE NUMBER OF CYLINDERS IN AN INTERNAL COMBUSTION ENGINE IN A VIRTUAL FASHION

(71) Applicant: Ford Global Technologies, LLC, Dearborn, MI (US)

(72) Inventor: Martin Wirth, Remscheid (DE)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 14/156,276

(22) Filed: Jan. 15, 2014

(65) Prior Publication Data

US 2014/0219470 A1 Aug. 7, 2014

(30) Foreign Application Priority Data

Feb. 5, 2013 (DE) ......................... 10 2013 201 878

(51) Int. Cl.
*H04B 1/00* (2006.01)
*G10K 15/02* (2006.01)
*G10K 11/16* (2006.01)

(52) U.S. Cl.
CPC ...................................... *G10K 15/02* (2013.01)

(58) Field of Classification Search
CPC .. H04R 2499/13; H04R 3/005; H04R 1/1083; H04R 3/00; G10K 11/175; G10K 2210/1282; H03G 3/00; H03G 3/20; H03G 3/24; B60R 11/0217; B60R 11/0247
USPC ........ 381/86, 71.4, 98, 120, 122, 320, 56, 57, 381/28
See application file for complete search history.

(56) References Cited

U.S. PATENT DOCUMENTS

2008/0192954 A1 * 8/2008 Honji et al. ..................... 381/86

FOREIGN PATENT DOCUMENTS

| | | | |
|---|---|---|---|
| DE | 19746523 | A1 | 5/1998 |
| DE | 19951650 | A1 | 5/2001 |
| EP | 1865494 | A1 | 12/2007 |

* cited by examiner

*Primary Examiner* — Paul S Kim
*Assistant Examiner* — Norman Yu
(74) *Attorney, Agent, or Firm* — Julia Voutyras; Alleman Hall McCoy Russell & Tuttle LLP

(57) ABSTRACT

A device to generate an engine noise and a method to generate the engine noise at a time period between two directly successive ignition events of an internal combustion engine wherein the engine noise increases the number of cylinders of the internal combustion engine in a virtual fashion.

12 Claims, 4 Drawing Sheets

INCREASING THE NUMBER OF CYLINDERS IN AN INTERNAL COMBUSTION ENGINE IN A VIRTUAL FASHION

CROSS REFERENCE TO RELATED APPLICATIONS

The present application claims priority to German Patent Application No. 102013201878.9, filed on Feb. 5, 2013, the entire contents of which are hereby incorporated by reference for all purposes.

BACKGROUND\SUMMARY

Downspeeding and downsizing of internal combustion engines is aimed to make available the same driving power at a relatively low rotational speed. Further it may produce more efficient, more fuel-economical, motor vehicles. This reduces frictional losses and may lower fuel consumption.

One approach to downspeeding and downsizing is providing a smaller cubic capacity internal combustion engine by reducing the number of cylinders. This leads to an engine that is operated with a higher load with the same driving power which reduces throttling losses and therefore may lead to lower fuel consumption. This also reduces frictional losses. The internal combustion engine may also be equipped with a turbocharger to make available the driving power which is require for high speeds.

Some of the problems recognized by the inventors with such set ups comes from the noise of the internal combustion engine with a reduced number of cylinders. The drivers tend to shift up at a relatively high rev rate since the drivers perform gear shifts according to what they hear. Motor vehicles with a reduced number of cylinders tend to be operated outside the efficient parameter ranges which are aimed at by downsizing and downspeeding and counteract the objective of reduced fuel consumption.

One solution is a method for generating an engine noise wherein a time period between two directly successive ignition events of an internal combustion engine is determined and a superimposed noise is generated at a time between the two directly successive ignition events. This has the effect of creating a virtual engine noise to virtually increase the number of cylinders in an internal combustion engine.

Another solution is a device for generating an engine noise comprising a sound generator and a control unit wherein the control unit is connected to the sound generator. In this way it is possible to generate a virtual engine noise and play it to the driver of the motor vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
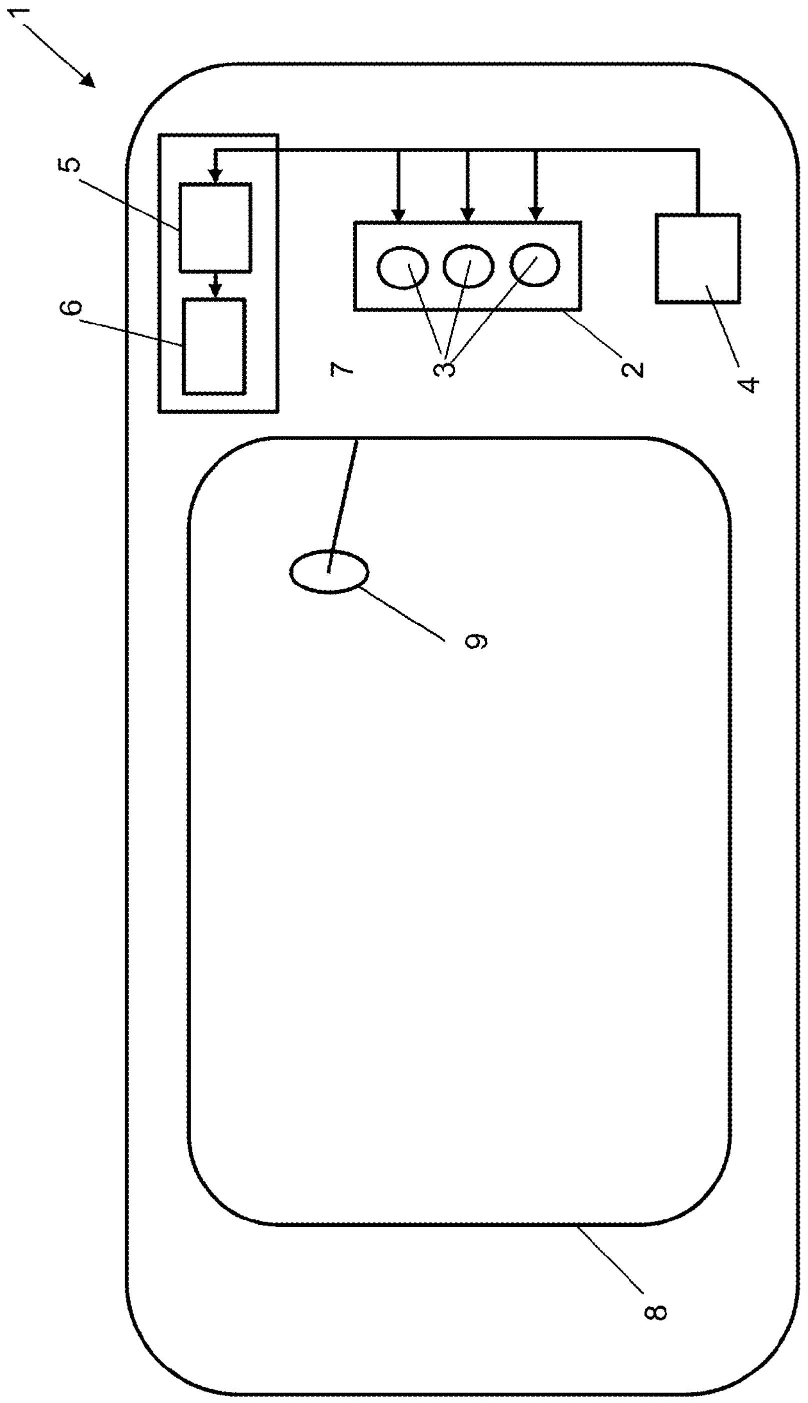
FIG. 1 shows a motor vehicle with a device for generating engine noise.

A method for generating engine noise, a device for generating engine noise and a motor vehicle having such a device are described below.

Downspeeding and downsizing are current trends in motor vehicle construction which are aimed at producing more efficient, that is to say more fuel-economical, motor vehicles. In the case of downspeeding efforts are made to make available the same driving power at a relatively low rotational speed of the internal combustion engine. As a result, frictional losses are reduced, which lowers the fuel consumption.

The idea on which downsizing is based is to equip motor vehicles of a comparable size and weight with engines with a smaller cubic capacity than was previously customary. This leads to a situation in which the engine is operated with a higher load, considered in relative terms, while requiring the same driving power, which reduces throttling losses and therefore leads to lower fuel consumption. In order, nevertheless, to be able to make available the driving power which is required for high speeds, the engine with the reduced cubic capacity is usually equipped with a turbocharger.

In particular in small vehicles, engines with a reduced number of cylinders, for example with three or only two cylinders, are increasingly being used in view of relatively small cubic capacities. This also reduces frictional losses.

The invention has the object of reducing further the fuel consumption of motor vehicles The invention therefore introduces a method for generating engine noise. The invention is based here on the realization and includes the realization that drivers of a motor vehicle with a reduced number of cylinders tend to drive the engine at a relatively high rev rate, that is to say at high rotational speeds, and only to shift up at a late point. This leads to the noise of an internal combustion engine with fewer cylinders sounding lower, owing to the correspondingly lower number of ignition events per revolution of the crankshaft, than conventional engines, for example four-cylinder or six-cylinder engines. Since so many drivers perform gear shifts—intentionally or unintentionally—according to what they hear, engines with a reduced number of cylinders are frequently operated at a relatively high rev rate, which, however, causes the engine to operate outside the efficient parameter ranges which are aimed at by downsizing and downspeeding and counteract the objective of reduced fuel consumption. The method therefore generates engine noise which is similar to the engine noise to be expected for an engine with a relatively high number of cylinders such that the shift behavior of the driver is influenced in the direction of more efficient operation. This means that the method of the invention causes the driver of the vehicle equipped with the internal combustion engine with a reduced number of cylinders to be provided with the expected acoustic feedback which is necessary for the intuitive control of the internal combustion engine.

In the method according to the invention, a time period between two directly successive ignition events of the internal combustion engine is determined. A superimposed noise is then generated at a time between the two directly successive ignition events. According to the method of the invention, the ignition events which have failed to occur owing to the reduction in the number of cylinders, or the acoustic expression thereof, are supplemented for the driver, as a result of which the noise which is expected for an engine with a relatively large number of cylinders is generated.

The time at which the superimposed noise is generated preferably occurs here after a first ignition event of the two directly successive ignition events by a time period which corresponds to the time period between the two directly successive ignition events divided by an integer larger than 1. This may be used for acoustically multiplying the perceived number of cylinders. The perceived number of cylinders is doubled by generating the superimposed noise chronologically in the center between the two directly successive ignition events, with the result that the integer is 2. However, a plurality of multiplicators can also be obtained in that correspondingly larger integers are used. In order to triple the perceived number of cylinders, the superimposed noise should preferably be generated twice between the two directly successive ignition events, once after a third and a further time after two thirds of the time period between the two ignition events. The same applies to relatively high integers, but due to practical considerations integers greater than 3 are less attractive.

The superimposed noise preferably has a wave form of ignition noise generated by an ignition event of the internal combustion engine. The more similar the modeling of the ignition noise generated by an ignition event of the internal combustion engine as a superimposed noise the better the result of the method. However, it is not necessary to simulate the ignition noise precisely since the superimposed noise and the actual engine noise of the internal combustion engine will overlap in many cases (i.e. basically the ignition noise and the superimposed noise can be longer than the time period between the time when the generation of the superimposed noise starts and one of the two directly successive ignition events) and individual ignition noises and overlapping noises cannot be perceived separately from one another in acoustic terms at the rotational speeds which are customary in motor vehicles.

In this context, the superimposed noise preferably has a lower amplitude than the ignition noise and is output to a passenger cell of the motor vehicle. As a result, the desired acoustic feedback is given to the driver without at the same time the noise emission of the motor vehicle being appreciably increased since the surroundings will perceive the essentially unchanged engine noise.

The superimposed noise is preferably structurally superimposed on a noise emission of the internal combustion engine. That is to say the method does not have the objective of reducing or eliminating the actual engine noise of the internal combustion engine. Instead, additional noise components are added to the engine noise.

The time period between the two directly successive ignition events can be determined by determining a preceding time period between two preceding directly successive ignition events of the internal combustion engine. The time period to be determined is then set to be equal to the preceding time period, which ensures sufficient accuracy in terms of the relatively low rate of change of the rotational speed of the engine. However, it is alternatively also possible to use the time periods or times of the ignition events which are determined in an engine control device for the method of the invention. This can take place, for example, by these time periods or times being transmitted to a unit which carries out the method of the invention or by the method according to the invention being carried out by the engine control device.

In one embodiment of the method, a noise emission of an ignition event of the internal combustion engine can be recorded and reproduced as superimposed noise. For this purpose it is possible, for example, to record the engine noise continuously and reproduce it as superimposed noise with a delay of a delay time period which is dependent on the current rotational speed. In order to prevent acoustic feedback, it is advantageous to output the superimposed noise with a relatively low amplitude directly into the passenger cell, as has already been described. However, it is also conceivable that noise emission of an ignition event which has been recorded once is played back repeatedly.

A second aspect relates to a device for generating engine noise. The device comprises a sound generator and a control unit which is connected to the sound generator and which is designed to carry out the method according to the invention. The second aspect also relates to a motor vehicle having an internal combustion engine and such a device.

The device and method are explained in more detail below with reference to illustrations of exemplary embodiments in which:

FIG. 1 shows a motor vehicle 1 with a device 7 for generating engine noise. The motor vehicle 1 comprises, in the example shown, an internal combustion engine 2 with three cylinders 3. However, the device may be used in an internal combustion engines with a different number of cylinders, in particular also in internal combustion engines with two cylinders. The internal combustion engine 2 is controlled by an engine control device 4 which prescribes the ignition times for the ignition events of the cylinders 3. For each revolution of the crankshaft of the engine precisely one ignition event takes place for each cylinder 3, at which ignition event the compressed fuel is ignited. However, each ignition event can also comprise the simultaneous or staggered generation of two or more ignition sparks, as is known, for example, from double ignition.

In the example in FIG. 1, the engine control device 4 transmits the ignition times as ignition signals to the cylinders 3 and to a control unit 5 of a device 7 for generating engine noise. However, the control unit 5 may also be embodied as part of the engine control device 4. It is also possible to determine the ignition times in the control unit 5 by, for example, measurements or by redundant processing of control parameters which are transmitted to the engine control device 4. The control unit 5 determines, from the ignition times, the time period between two actual ignition events of the cylinders 3 of the internal combustion engine 2 and calculates therefrom times at which a superimposed noise is to be generated. The superimposed noises are then generated by a sound generator 6 at the calculated times. In the example shown in FIG. 1, the superimposed noises are predominantly output by the sound generator 6 into a passenger cell 8 of the motor vehicle 1 and in the vicinity of a steering wheel 9 and therefore of a driver of the motor vehicle 1. As a result, the volume of the superimposed noises can be kept small compared to that of the actual ignition events of the internal combustion engine 2.

Figure 2:
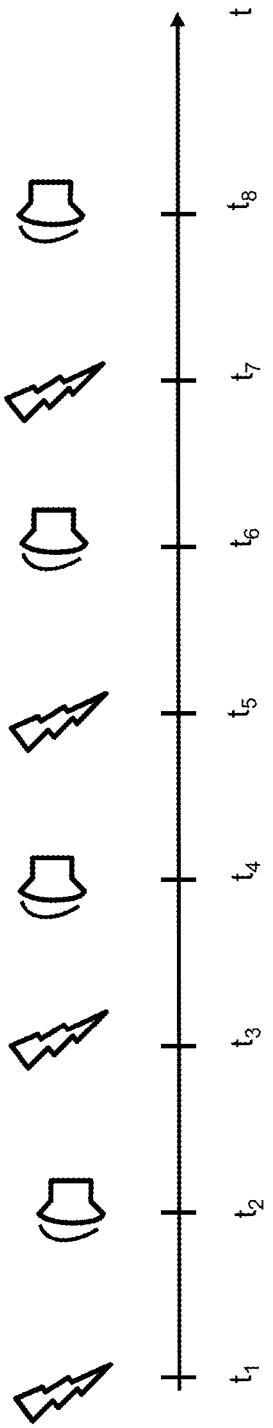
FIG. 2 shows a time diagram of a first exemplary embodiment of the method.

FIG. 2 shows a time diagram of a first exemplary embodiment of the method. The figure shows a time sequence of ignition events (illustrated by lightning symbols) and the generation of superimposed noises (illustrated by a schematic loudspeaker). In the first exemplary embodiment, ignition events take place at the times $t_1$, $t_3$, $t_5$ and $t_7$. In each case, a superimposed noise is generated between these times in order to thus simulate acoustically a relatively large number of ignition events per time and therefore a relatively high number of cylinders, which has the effects already described on the gear shifting behavior and driving behavior of a driver who is shifting gear according to his hearing, and gives rise to reduced consumption of fuel. The superimposed noises are generated at the times $t_2$, $t_4$, $t_6$ and $t_8$ which should lie as far as possible centrally between the respective adjacent ignition times. The time intervals between the ignition events are dependent here on the respective rotational speed of the internal combustion engine 2, for which reason the time periods between the respective ignition events and also between an ignition event and adjacent generation of superimposed noise usually change in the course of the execution of the method. The exemplary embodiment illustrated in FIG. 2 doubles the number of cylinders of the internal combustion engine in terms of acoustic impression. As a result, it is possible to generate an engine noise of a six-cylinder engine with a three-cylinder engine or an engine noise of a four-cylinder engine with a two-cylinder engine, for example.

Figure 3:
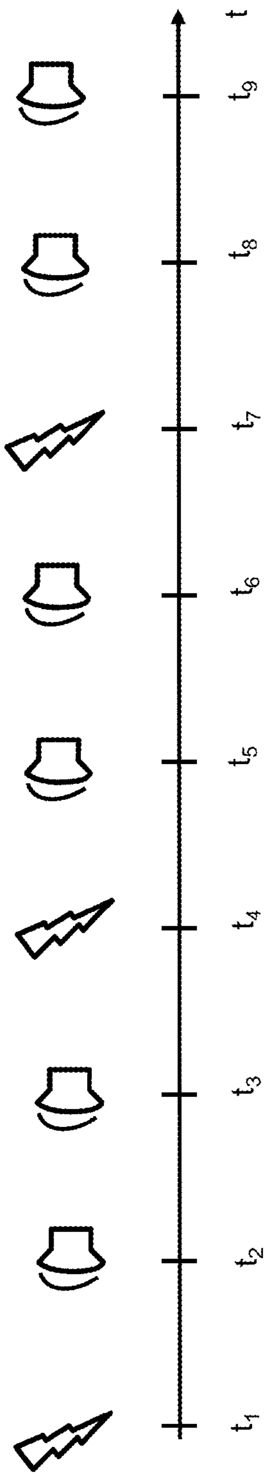
FIG. 3 shows a time diagram of a second exemplary embodiment of the method.

FIG. 3 shows a time diagram of a second exemplary embodiment of the method in which ignition events take place at the times $t_1$, $t_4$ and $t_7$. However, in contrast to the first exemplary embodiment in FIG. 2, in each case two superimposed noises are generated between the ignition events, namely at the times $t_2$ and $t_3$, $t_5$ and $t_6$, as well as $t_8$ and $t_9$. The individual times of the superimposed noises are also preferably to have the same duration here in relation to the respectively adjacent superimposed noise or ignition event. In the second exemplary embodiment, an acoustic impression of tripling the number of cylinders of the internal combustion engine is achieved. As a result, an engine noise of a six-cylinder engine can be generated with a two-cylinder engine, for example.

Figure 4:
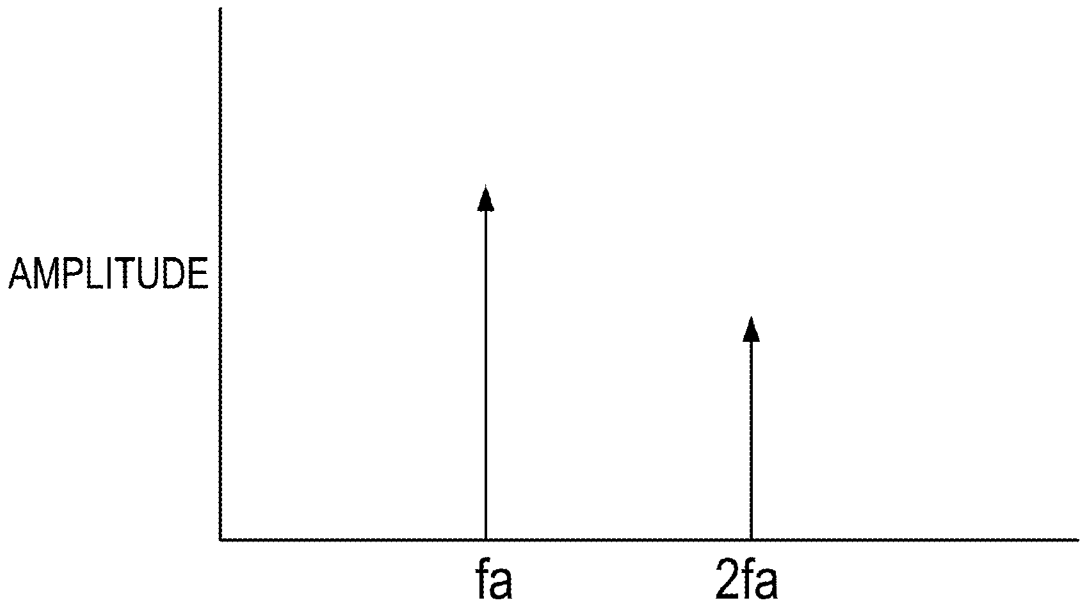
FIG. 4 shows a of a superimposed noise frequency.

Turning to FIG. 4 the generated superimposed noise is shown relative to the engine noise. The ignition noise occurs at a frequency fa for a set of engine operating parameters. The superimposed noise frequency may be the engine firing frequency or twice the firing frequency 2 fa, and may be generated by the device 7 to occur at a time as described in FIGS. 2 and/or 3. The amplitude of the generated noise may be lower than the amplitude of the engine noise. The ignition noise amplitude and frequency may be measured and/or estimated based on the engine rpm and the actual engine firing frequency sounds, for example, measuring with a microphone. A filter may be used to remove the firing frequency noise (such as a notch filter) from the generated superimposed noise to help reduce audio feedback.

Figure 5:
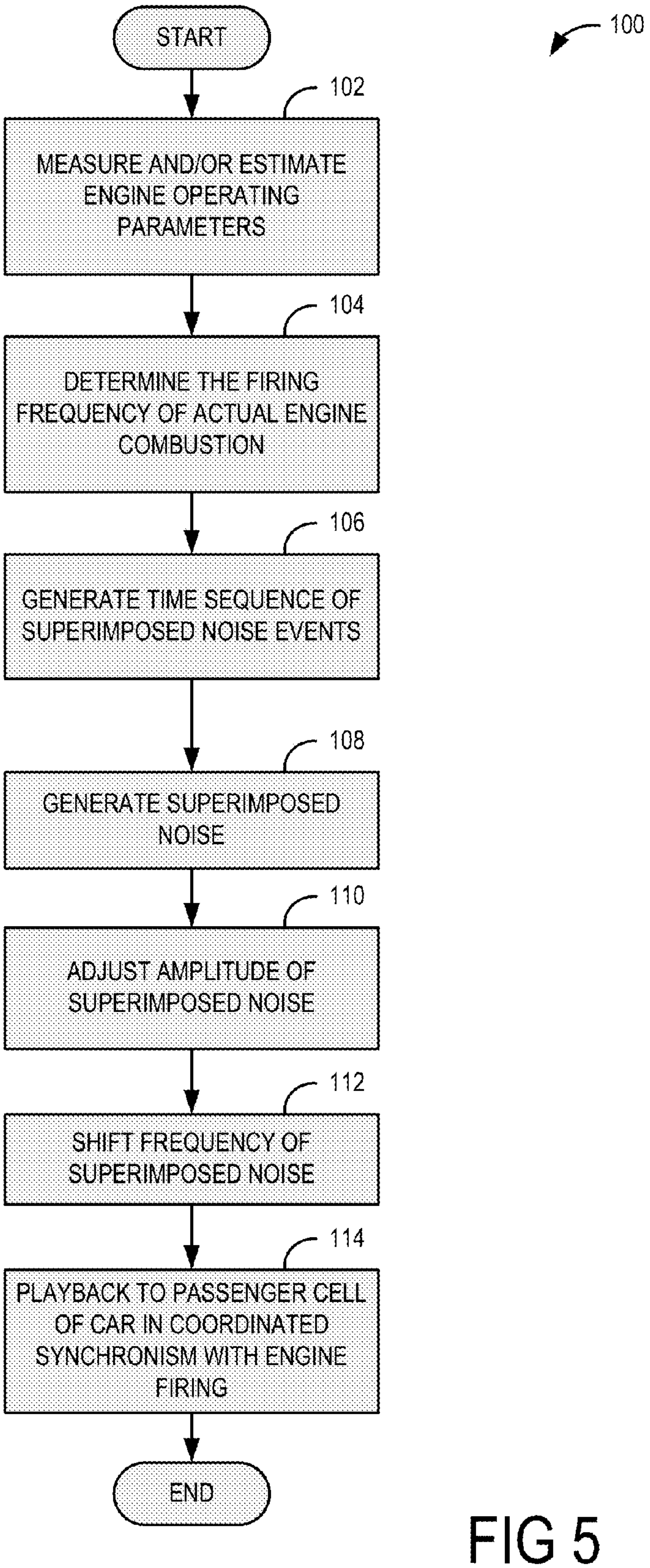
FIG. 5 shows an example method to generate virtual engine noise.

Turning to FIG. 5 a method 100 is shown to generate the engine noise. The method 100 may be implemented by the engine and the device as described in FIGS. 2 and 3 or may be implemented by other suitable engines and sound generating devices.

At 102, the method may measure and/or estimate the engine operating parameters, for example, engine load and temperature. The actual engine noise may vary based on the engine operating conditions. For example, the engine load may be used to determine the inherent engine sound level and the RPM may be used to determine the fundamental frequency of the ignition events.

At 104, the method may determine the firing frequency of the actual engine combustion. The engine control device 4 transmits the ignition times as ignition signals to the cylinders and the control unit 5 determines, from the ignition times, the time period between two actual ignition events. This may be done by determining a time period between two directly successive ignition events of the internal combustion engine. Alternatively, this may be done by determining a time period between two preceding directly successive ignition events of the internal combustion engine.

At 106, the method may generate the time sequence for the superimposed noise. The time sequence, for example as described in FIGS. 2 and 3, occurs after a first ignition event of the two directly successive ignition events by a time period which corresponds to the time period between the two directly successive ignition events divided by an integer larger than 1. For example, the integer 2 is used in FIG. 2, and the integer 3 is used in FIG. 3. Larger integers may be used. Further, the time sequence for the superimposed ignition event may be determined using a time period between two preceding directly successive ignition events of the internal combustion engine.

At 108, the method may generate the superimposed noise. The superimposed noise may have a wave form of ignition noise similar to the ignition noise generated by an ignition event of the internal combustion engine. Further, the method may generate a superimposed noise from a recording.

At 110, the method may adjust the amplitude of the superimposed noise. The superimposed noise preferably has lower amplitude than the actual ignition noise. The amplitude may be adjusted based on the ignition noise, the RPM, engine load, etc.

At 112, the method may shift the frequency of the superimposed noise to correspond with the time sequence. For example, a frequency of 2 fa may be used to virtually double the number of cylinders of an engine with an actual ignition frequency of fa.

At 114, the method may playback the superimposed noise on a noise emission of the internal combustion engine to the passenger cell of the car. The superimposed noise may be output through the sound generator into the passenger cell and in the vicinity of a steering wheel and therefore of a driver of the motor vehicle. The superimposed noise playback occurs at equally spaced time intervals between the engine firing events as described in FIGS. 2 and 3. For example, the superimposed noise from the speakers may be phase-aligned to be in-phase with the engine-generated combustion noise. Further, a filter may be applied in order to reduce acoustic feedback. The duration of the superimposed noise may also be adjusted during playback to adjust for various engine operating parameters.

The invention claimed is:

1. A method for generating an engine noise comprising:

determining a time period between two directly successive ignition events of an internal combustion engine; and generating a superimposed noise at the time period between the two directly successive ignition events;

wherein the time period between the two directly successive ignition events is determined by determining a preceding time period between two preceding directly successive ignition events of the internal combustion engine and setting the time period to be equal to the preceding time period.

2. The method of claim 1, wherein the time period occurs after a first ignition event of the two directly successive ignition events by a time period which corresponds to the time period between the two directly successive ignition events divided by an integer larger than 1.

3. The method of claim 2, in which the integer is 2 or 3.

4. The method of claim 1, wherein the superimposed noise has a wave form of an ignition noise generated by an ignition event of the internal combustion engine.

5. The method of claim 4, wherein the superimposed noise has a lower amplitude than the ignition noise and wherein the superimposed noise is output to a passenger cell of a motor vehicle.

6. The method of claim 1, wherein the superimposed noise is structurally superimposed on a noise emission of the internal combustion engine.

7. The method of claim 1, further comprising generating a second superimposed noise at the time period between the two directly successive ignition events of the internal combustion engine.

8. The method of claim 1, wherein a noise emission of an ignition event of the internal combustion engine is recorded and reproduced as the superimposed noise.

9. A device for generating an engine noise comprising:

a sound generator; and a control unit including memory with codes stored therein, the control unit connected to the sound generator, a code for determining a time period between two directly successive ignition events of an internal combustion engine; and generating a superimposed noise via the sound generator at the time period between the two directly successive ignition events; wherein the time period between the two directly successive ignition events is determined by determining a preceding time period between two preceding directly successive ignition events of the internal combustion engine and setting the time period to be equal to the preceding time period.

10. The device of claim 9, wherein the device is in a motor vehicle having the internal combustion engine.

11. The method of claim 1, wherein the superimposed noise has an amplitude based on a RPM of the internal combustion engine and an actual engine firing frequency sound.

12. The device of claim 9, further comprising a filter wherein an actual engine firing frequency sound is filtered.

* * * * *